United States Patent [19]

Briffod

[11] 4,215,261
[45] Jul. 29, 1980

[54] EDM APPARATUS FOR CUTTING A GROOVE IN A RECESS IN A WORKPIECE

[75] Inventor: Jean-Paul Briffod, Monnetier-Mornex, France

[73] Assignee: Ateliers des Charmilles S.A., Geneva, Switzerland

[21] Appl. No.: 900,976

[22] Filed: Apr. 28, 1978

[30] Foreign Application Priority Data

May 6, 1977 [CH] Switzerland ............... 5680/77

[51] Int. Cl.² ............................................. B23P 1/12
[52] U.S. Cl. ............................................. 219/69 V
[58] Field of Search .............. 219/69 E, 69 V, 69 M, 219/69 R

[56] References Cited

U.S. PATENT DOCUMENTS

| | | | |
|---|---|---|---|
| 2,753,429 | 7/1956 | McKechnie | 219/69 V |
| 2,773,968 | 12/1956 | Martellotti et al. | 219/69 X |
| 3,539,754 | 11/1970 | Furze et al. | 219/69 V |
| 3,809,852 | 5/1974 | Weber | 219/69 V |
| 4,104,501 | 8/1978 | Wyss | 219/69 M |
| 4,104,503 | 8/1978 | DiPiazza et al. | 219/69 E |
| 4,135,070 | 1/1979 | Pfau et al. | 219/69 M |

Primary Examiner—B. A. Reynolds
Assistant Examiner—Clifford C. Shaw
Attorney, Agent, or Firm—Hauke and Patalidis

[57] ABSTRACT

An EDM apparatus for cutting a groove in the wall of a recess in an electrode workpiece by means of an electrode tool. One of the electrodes is mounted on a movable support displaceable along the feed axis and along a path in the plane perpendicular to the feed axis, the other electrode being mounted on a movable support displaceable on the feed axis from a pre-determined reference position.

7 Claims, 3 Drawing Figures

FIG. I

EDM APPARATUS FOR CUTTING A GROOVE IN A RECESS IN A WORKPIECE

BACKGROUND OF THE INVENTION

The present invention relates to an apparatus for machining by electrical discharges an electrode workpiece by means of an electrode tool, the electrodes being displaced relative to each other along a feed axis of the electrode tool within the workpiece and in a plane perpendicular to the feed axis.

It is known in EDM technology that imparting a translation motion to one of the electrodes in a plane perpendicular to the feed axis of the electrode tool relative to the electrode workpiece presents the advantage of obtaining a controlled quasi-enlargement of the transverse section of the electrode tool during its feed into the workpiece.

Devices for achieving such results are disclosed in U.S. Pat. Nos. 3,539,754 and 3,809,852, which further disclose means for progressively varying the amplitude of the translation motion as a function of the amount of penetration of the electrode tool within the workpiece, such as to provide the surface of a cavity in the workpiece with a predetermined taper. Another known machining method consists in varying the amount of eccentricity of the translation motion in the same ratio as the relative displacement of the electrodes along the feed axis. By such a method, a three-dimensional expansion of the electrode tool is obtained together with a simultaneous control of the axial and radial feeds.

Because they provide a relative feed of the electrodes always comprising an axial component, those prior art apparatus and methods do not permit to effectuate a machining of the electrode workpiece exclusively in a radial direction, for example, for machining a groove, by means of an electrode tool in the form of a disc, in the lateral surface of a cavity in the electrode workpiece.

The apparatus of the invention has for principal object to provide an arrangement permitting to transform a three-dimensional machining operation into a controlled radial machining operation. The apparatus of the invention further presents the advantage of being adaptable to all the prior art apparatus wherein the amount of eccentricity of radial displacement of an electrode varies as a function of the axial relative displacement of the electrode tool and the electrode workpiece. The invention provides a simple and economical fixture for modifying the axial component of the relative translation motion of the electrodes during three-dimensional EDM machining, such as to change the path of the translation motion to provide the workpiece with a predetermined shape.

SUMMARY

The present invention accomplishes its objects by providing an EDM machine having a movable member displaced along the electrode feed axis by means of a servo-motor, such as to maintain predetermined machining conditions in the machining zone between the electrodes, a first movable platen supporting one of the electrodes being mounted on the movable member, means for displacing the first movable platen along two perpendicular axes in a plane perpendicular to the feed axis and means for controlling the amplitude of displacement of the first movable platen as a function of the displacement of the movable member, with the improvement of a second movable platen on which is mounted the other electrode, and of means for axially displacing the second movable platen by way of the movable member from a predetermined reference axial position of the movable member.

BRIEF DESCRIPTION OF THE DRAWING

The many objects and advantages of the present invention will become apparent to those skilled in the art when the following description of the best mode contemplated for practicing the invention is read in conjunction with the accompanying drawing wherein like reference numerals refer to like parts and in which.

DETAILED DESCRIPTION OF THE PREFERRED EMBODIMENT

Figure 1:
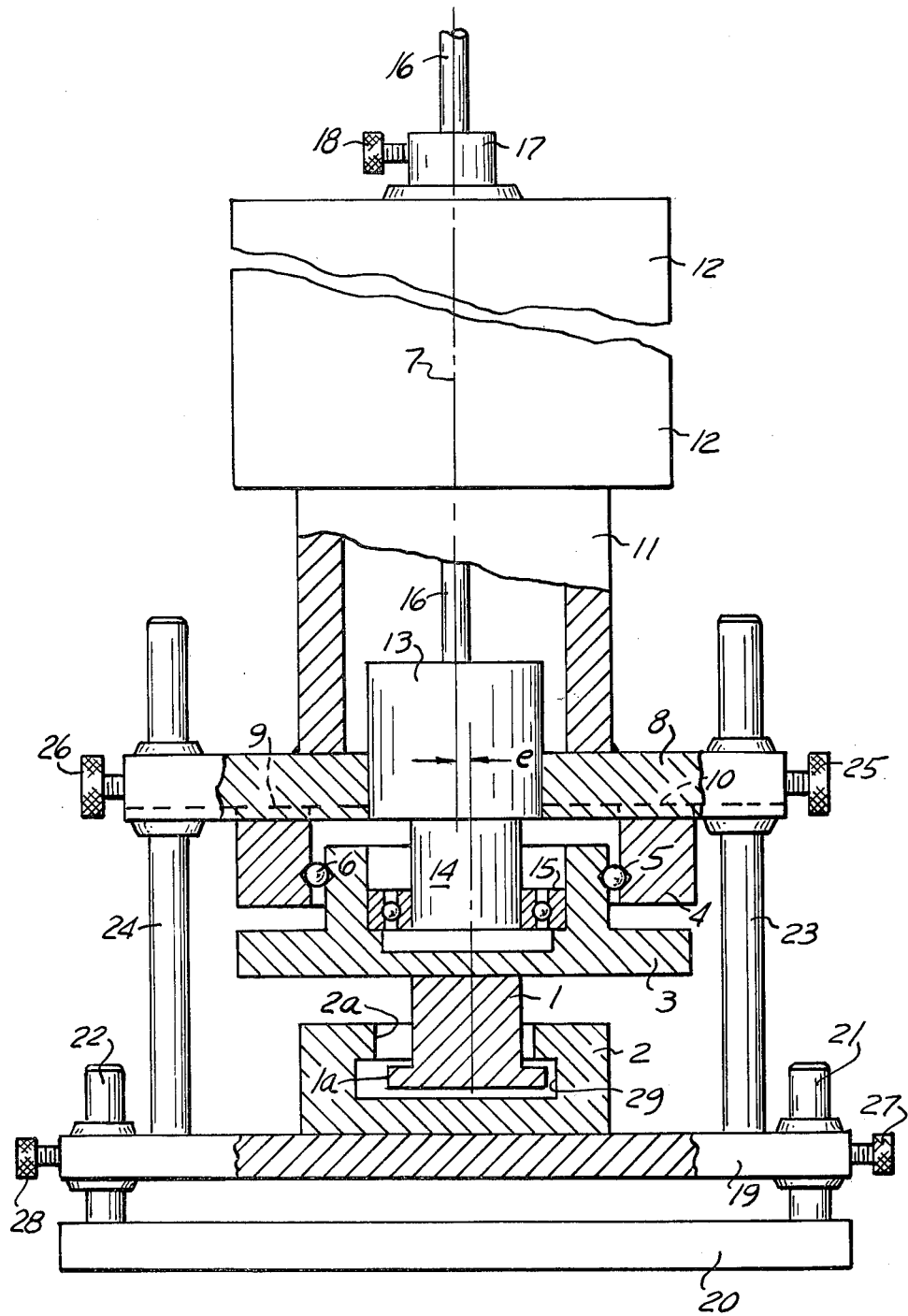
FIG. 1 illustrates partly in elevation and partly in section a simplified structure according to the present invention.

Referring to FIG. 1, an electrode tool 1, which is provided with a disc-shaped annular shoulder active portion 1a, is schematically illustrated as being displaceable relative to an electrode workpiece 2. For that purpose, the electrode tool 1 is affixed to the bottom of a movable support platen 3 which is slidably linearly displaceable relative to a second displaceable platen 4 by being supported thereby by means of linear ball slides 5 and 6, along an axis perpendicular to the axis 7 of longitudinal feed of the electrode tool 1 within the electrode workpiece 2. The displaceable platen 4 is mounted such as to be linearly slidably displaceable relative to a reciprocable member 8 by means of linear ball bearings 9 and 10 and along an axis perpendicular to the axes of the linear ball bearings 5 and 6 and to the axis 7. The reciprocable member 8 is the ram of the EDM machine which is rigidly affixed to the end of the piston 11 of a hydraulic servo-motor 12 controlled such as to maintain predetermined electrical discharge machining conditions in the machining zone between the active portion 1a of the electrode tool 1 and the workpiece 2.

The control circuit of the servo-motor 12, the electrical discharge pulse generator, and the dielectric fluid circulation system, all forming part of the EDM apparatus of FIG. 1, are not illustrated, as such an arrangement is well known in the EDM art. The lateral translation motion of the platen 3 relative to the reciprocable member 8 is provided by a variable eccentricity mechanism comprising a stationary member 13 mounted on the axially reciprocable member 8 and a stub shaft 14 supported by ball bearings 15 relative to the platen 3 holding the electrode tool 1. The amount of eccentricity e of the stub shaft 14 relative to the axis 7 of the stationary member 13 is controlled according to the relative longitudinal displacement of a rod 16 relative to the stationary member 13 by a mechanical or electrical mechanism, not shown at FIG. 1. An example of such mechanism is shown in detail at FIG. 2 and will be described hereinafter. The rod 16 is provided at its top with a longitudinally positionable abutment collar 17 whose longitudinal position along the rod 16, once adjusted, is set by means of a set screw 18. The abutment collar 17 prevents further axial displacement of the rod 16 in a downward direction by engaging the upper face of the housing of the servo-motor 12.

The electrode workpiece 2 is mounted on a plate 19 axially movable relative to a second plate 20 in turn fixedly mounted on the machine table, not shown, the plate 19 being supported by the plate 20 by means of guide posts 21 and 22. The plate 19 supports in turn guiding posts 23 and 24 slidable in appropriate bushings mounted in the axially reciprocable movable member 8. Set screws 25 and 26 permit to immobilize the plate 19 at a predetermined fixed distance from the reciprocable member 8, and set screws 27 and 28 permit to hold the plates 19 and 20 in a predetermined spaced apart relative position.

The apparatus of FIG. 1 operates as follows:

According to a first mode of operation, the plate 19 is held in a predetermined position relative to the plate 20, and the set screws 25 and 26 are backed up such as to enable the reciprocable member 8 to be displaced relative to the plate 19. As long as the abutment collar 17 is positioned along the rod 16 such as to enable the rod 16 to be displaced axially in unison with the piston 11 and the reciprocable member 8, machining progresses normally in the direction of penetration of the electrode tool 1 within the workpiece 2 with an amount of eccentricity of the translation motion which remains constant and which may be set to be zero, if so desired. When the abutment collar 17 engages the top surface of the housing of the servo-motor 12, the rod 16 is held stationary and the displacement of the stationary member 13 relative to the rod 16 causes the amount of eccentricity of the translation motion of the electrode tool in a plane perpendicular to the axis 7 of longitudinal feed to increase as a function of the longitudinal displacement of the piston 11 and the reciprocable member or ram 8. In such manner, a radial component is added to the axial component of the electrodes relative motion, such that the resultant relative motion follows a path at an angle relative to the axis 7 of penetration of the electrode tool 1 within the workpiece 2. If the ratio between the axial displacement and the radial displacement is equal to 1, a three-dimensional machining of the electrode workpiece 2 is effected, resulting from the displacement of the piston 11 of the servo-motor 12.

When a groove 29 is to be machined in the lateral wall of the cavity formed in the workpiece 2, a second mode of operation is adopted which results from immobilizing the plate 19 relative to the reciprocable member 8 by means of tightening the set screw 25 and 26, and from freeing the plate 19 relative to the plate 20 by backing up the set screws 27 and 28. Under this setup, the electrode tool 1 can no longer be advanced or withdrawn relative to the electrode workpiece 2, and machining of the bottom of the cavity 2a is stopped. However, the amount of eccentricity of the translation motion continues to increase as a function of the axial displacement of the piston 11, and machining progresses only in a radial direction perpendicular to the axis of feed 7, thus forming a groove 29 in the wall of the cavity 2a, corresponding to the disc-shaped annular shoulder 1a of the electrode tool 1. The apparatus of the invention therefore permits to eliminate the axial component of the relative motion of the electrodes, starting from a predetermined axial relative reference position of the electrodes, while maintaining the radial component of the motion.

Figure 2:
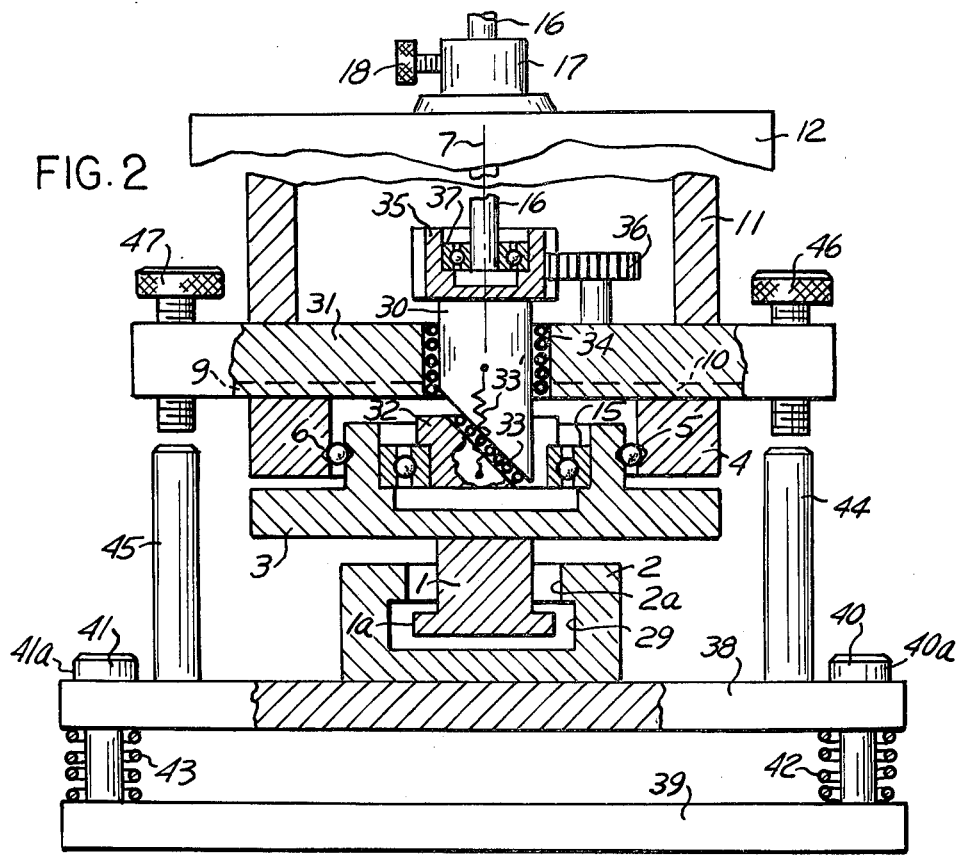
FIG. 2 is a partial illustration of a first modification thereof.

A modification of the apparatus is illustrated at FIG. 2. The amount of eccentricity of the translation motion is controlled by the axial displacement of a shaft 30 relative to a reciprocable member or ram 31 rigidly connected to the piston 11 of the servo-motor 12. The shaft 30 is mounted such as to axially slide relative to an eccentric member 32 to which it is connected by way of corresponding surfaces in a plane at an angle relative to the axis 7, linear ball bearings 33 being disposed between the corresponding surfaces. The eccentric member 32 is rotatably mounted in the displaceable platen 3, which supports the electrode tool 1, by means of a ball bearing 15. The shaft 30 is axially guided and is rotatable relative to the reciprocable member 31 by means of linear ball bearings 34. The shaft 30 and the eccentric member 32, held by a spring 33' in engagement with each other at their corresponding surfaces provided with the linear bearings 33, are rotatably driven by a toothed wheel 35 and a gear 36, the gear 36 being driven by an electric motor not shown at FIG. 2. The control rod 16 is mounted on the top of the toothed wheel 35 by means of a ball bearing 37.

The electrode workpiece 2 is mounted on a movable plate 38 which is axially guided by means of guide posts 40 and 41 relative to a stationary plate 39, mounted on the EDM machine table, not shown. Springs 42 and 43 urge the movable plate 38 in engagement with the guide post enlarged heads 40a and 41a acting as abutments. The movable plate 38 supports columns 44 and 45 whose upper faces are each engageable with an end of one of micrometric thread screws 46 and 47, which adjustably determine the axial position of the electrode tool, during its feed into the workpiece, from which machining in a radial direction begins. When this occurs, the reciprocable member 31 axially displaces the movable plate 38, while compressing the springs 42 and 43, such as to maintain a constant axial distance between the electrode tool 1 and the workpiece 2. However, when the abutment collar 17 on the rod 16 engages the upper surface of the housing of the servo-motor 12, the rod 16 is prevented from further longitudinal axial displacement, and the lateral displacement of the eccentric member 32 relative to the shaft 30, which is retained against further axial displacement by the rod 16, causes in turn a lateral displacement of the electrode tool 1 relative to the workpiece 2, that relative lateral displacement of the electrodes being controlled by the axial displacement of the piston 11 of the servo-motor.

In this manner, lateral machining of the electrode workpiece without relative axial feed may adjustably be effected, starting from a predetermined position of penetration of the electrode tool into the electrode workpiece. Withdrawal of the electrode tool from the workpiece, during abnormal machining conditions, is effected in an inverse order, i-e. first in a radial direction, followed in turn by an angular direction, and followed finally by a motion in an axial direction. Depending on the setting of the abutment collar 17 relative to the micrometric adjusting screws 46 and 47, axial machining can be directly transformed into radial machining.

The novel apparatus of the invention can be used with many other systems designed for displacing the electrodes relative to each other, for example, by replacing the mechanical control of the amount of eccentricity by an electrical control slaved to the axial progression of machining, or by using arrangements similar to those disclosed in U.S. Pat. No. 3,809,852.

Figure 3:
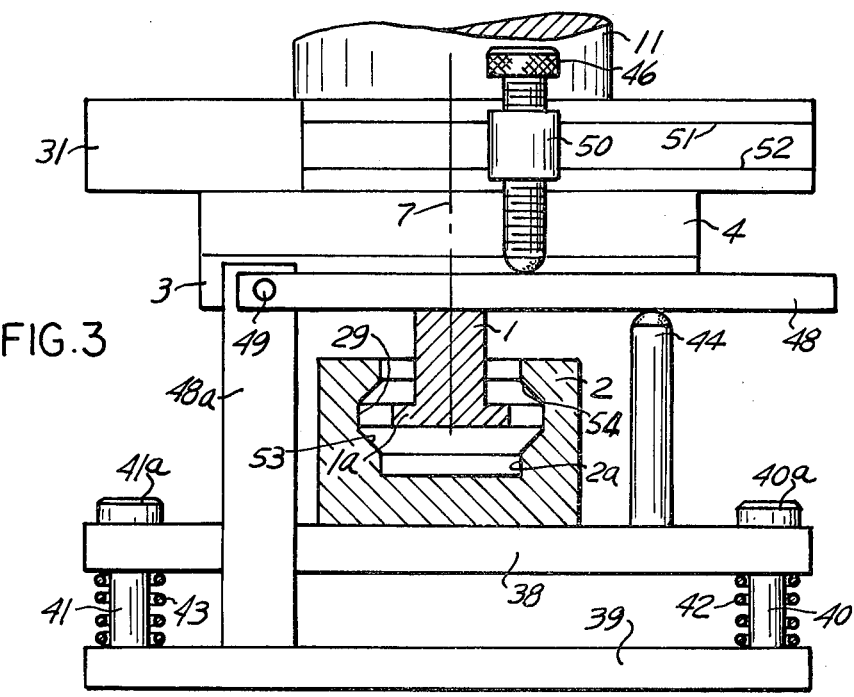
FIG. 3 is a partial illustration of a further modification thereof.

A further modification of the invention is shown at FIG. 3. The radial translation motion of the electrode tool 1 is controlled as a function of the axial displacement of the reciprocable member or ram 31 by the same mechanical arrangement as illustrated at FIG. 2, the relative displacement between the reciprocable member 31 and the movable plate 38 being obtained by means of a lever 48 supported by an arm 48a from the stationary base plate 39 and pivotable about a pivot pin 49 located at a fixed position relative to the base plate 39 which is mounted on the machine table. The micrometric screw 46, whose end forms an adjustable abutment, is mounted on a slide 50 which is displaceable relative to the reciprocable member or ram 31 by means of longitudinal bearings 51 and 52. In such manner, the lateral position of the screw 46 is adjustable, thus adjustably displacing the point of application of the end of the screw 46 along the length of the arms 48, modifying at will the ratio of the speeds at which the reciprocable member 31 and the movable platen 38 supporting the electrode workpiece 2 are axially displaced.

When the end of the screw 46 engages the lever 48 between its pivot pin 49 and the point of application of the end of the post 44, as shown at FIG. 2, the plate 38 on which is mounted the workpiece 2 is displaced more rapidly than the reciprocable member 31, and the axial component of the translation motion becomes negative, which results in causing the electrode tool 1 to be progressively withdrawn from the workpiece 2 when the translation motion amplitude increases. In this manner, the cavity in the workpiece is provided with a taper 53, or conicity, which has an orientation opposite to the taper 54 obtained when the workpiece support plate 38 is stationary.

When the slide 50 is set in a position for which the point of application of the end of the screw 46 on the lever 48 is on the other side of the pivot of application of the end of the post 44, the axial component of the relative translation motion is increased, which has for result to decrease the inclination of the path followed by such a motion. In this manner, a predetermined taper may be provided on the lateral surface of the cavity in the workpiece.

I claim:

1. In an apparatus for machining by electrical discharges an electrode workpiece by means of an electrode tool wherein said apparatus has a stationary table and said electrodes are displaced one relative to the other in translation in a plane perpendicular to a longitudinal axis of penetration of the electrode tool into the electrode workpiece, said apparatus comprising a reciprocable member displaced along said axis by means of a servo-motor such as to maintain predetermined machining conditions in a machining zone between said electrodes, a first movable platen supporting one of said electrodes mounted on said reciprocable member, means for displacing said first movable platen along two axes perpendicular to said first axis, and means for controlling the amplitude of displacement of said first movable platen as a function of said displacement of said reciprocable member, the improvement comprising a second movable platen supporting the other of said electrodes, means for displacing by way of said reciprocable member said second movable platen along said first axis, biasing means disposed between said second movable platen and said apparatus table, said biasing means providing a force which opposes the displacement of said second movable platen along said first axis, and at least one adjustable abutment for driving said second movable platen by means of said reciprocable member in the direction of said axis from an initial axial position of said reciprocable member and second movable platen.

2. The improvement of claim 1 comprising means for fixedly mounting said second movable platen relative to said reciprocable member, and means for fixedly mounting said second movable platen relative to the table of said apparatus.

3. The improvement of claim 1 comprising means for maintaining a constant and adjustable ratio between the speed of displacement of said second movable platen and the speed of displacement of said reciprocable member.

4. An apparatus for machining by electrical discharges an electrode workpiece by means of an electrode tool, said apparatus comprising a stationary table, a reciprocable member, means for displacing said reciprocable member along an axis of penetration of one electrode into the other such as to maintain predetermined machining conditions in a machining zone between said electrodes, a first movable plate supporting one of said electrodes mounted on said reciprocable member, means for displacing said first movable platen in translation in a plane perpendicular to said axis, means for maintaining a constant ratio between the amplitude of displacement of said first movable platen in said plane and said displacement of said reciprocable member along said axis, a second movable platen supporting the other of said electrodes, and means for displacing said second movable platen along said axis as a function of the displacement of said reciprocable member.

5. The apparatus of claim 4 further comprising means fixedly mounting said second movable platen relative to said reciprocable member such as to displace said second movable platen in unison with said reciprocable member.

6. The apparatus of claim 4 further comprising biasing means disposed between said second movable platen and said stationary table, said biasing means providing a force which opposes the displacement of said second movable platen along said axis, and at least one adjustable abutment for driving said second movable platen by means of said reciprocable member in the direction of said axis from an initial axial position of said reciprocable member and a second movable platen.

7. The apparatus of claim 6 comprising a lever maintaining a constant and adjustable ratio between the displacement of said second movable platen and the displacement of said reciprocable member.

* * * * *

UNITED STATES PATENT AND TRADEMARK OFFICE
CERTIFICATE OF CORRECTION

PATENT NO. : 4,215,261
DATED : July 29, 1980
INVENTOR(S) : Jean-Paul Briffod

It is certified that error appears in the above-identified patent and that said Letters Patent are hereby corrected as shown below:

Column 2, line 57, "e" should be --e--.

Column 6, line 29, "plate" should be --platen--.

Signed and Sealed this

Twentieth Day of January 1981

[SEAL]

Attest:

RENE D. TEGTMEYER

Attesting Officer     Acting Commissioner of Patents and Trademarks